United States Patent [19]

McCanse et al.

[11] 3,997,069
[45] Dec. 14, 1976

[54] ROUND BALE HAULER AND UNROLLER

[75] Inventors: James Edson McCanse; Timothy A. Sevick, both of Oregon, Ill.

[73] Assignee: Hesston Corporation, Hesston, Kans.

[22] Filed: July 28, 1975

[21] Appl. No.: 599,583

[52] U.S. Cl. .......................... 214/147 G; 214/653; 294/88; 294/107
[51] Int. Cl.² ........................................ B66C 1/44
[58] Field of Search ....... 214/147 R, 147 G, 147 T, 214/DIG. 12, DIG. 4, 653, 1 BC, 1 BD; 294/88, 106–109

[56] References Cited
UNITED STATES PATENTS

| 3,263,838 | 8/1966 | Herolf | 214/147 R |
| 3,631,989 | 1/1972 | McCormick | 214/1 BD |
| 3,854,609 | 12/1974 | Cox | 214/147 G |
| 3,908,846 | 9/1975 | Brummitt | 214/653 X |
| 3,946,887 | 3/1976 | Parker | 214/653 |

Primary Examiner—Robert S. Ward, Jr.
Attorney, Agent, or Firm—Schmidt, Johnson, Hovey & Williams

[57] ABSTRACT

The round bale handling apparatus is adapted for mounting on the three-point hitch of a farm tractor and has a vertically swingable, normally fore-and-aft extending boom provided with a crosshead at its outermost end having depending arms that clamp and rotatably support a round bale concentrically by its opposite ends to progressively unroll the bale for feeding the latter as the tractor is advanced. The crosshead can be swung about a vertical axis between a position transverse to the boom and a position disposed substantially alongside the latter such that the bale can be approached and picked up from a number of different directions and within relatively close confines. In addition, the crosshead is free to swing by gravity to a limited extent toward and away from the tractor so that the bale hangs freely from the boom even when the latter is tipped up or down during operation, such maneuverability also permitting the bale to be trailed rearwardly beyond the boom as the bale is unrolled and the tractor advanced or, alternatively, permitting the bale to be tucked under the boom and unrolled in that position as the tractor is backed up. The crosshead can also swivel to a limited extent about the longitudinal axis of the boom, limited only by spring pressure whereby to facilitate maneuverability and handling.

10 Claims, 6 Drawing Figures

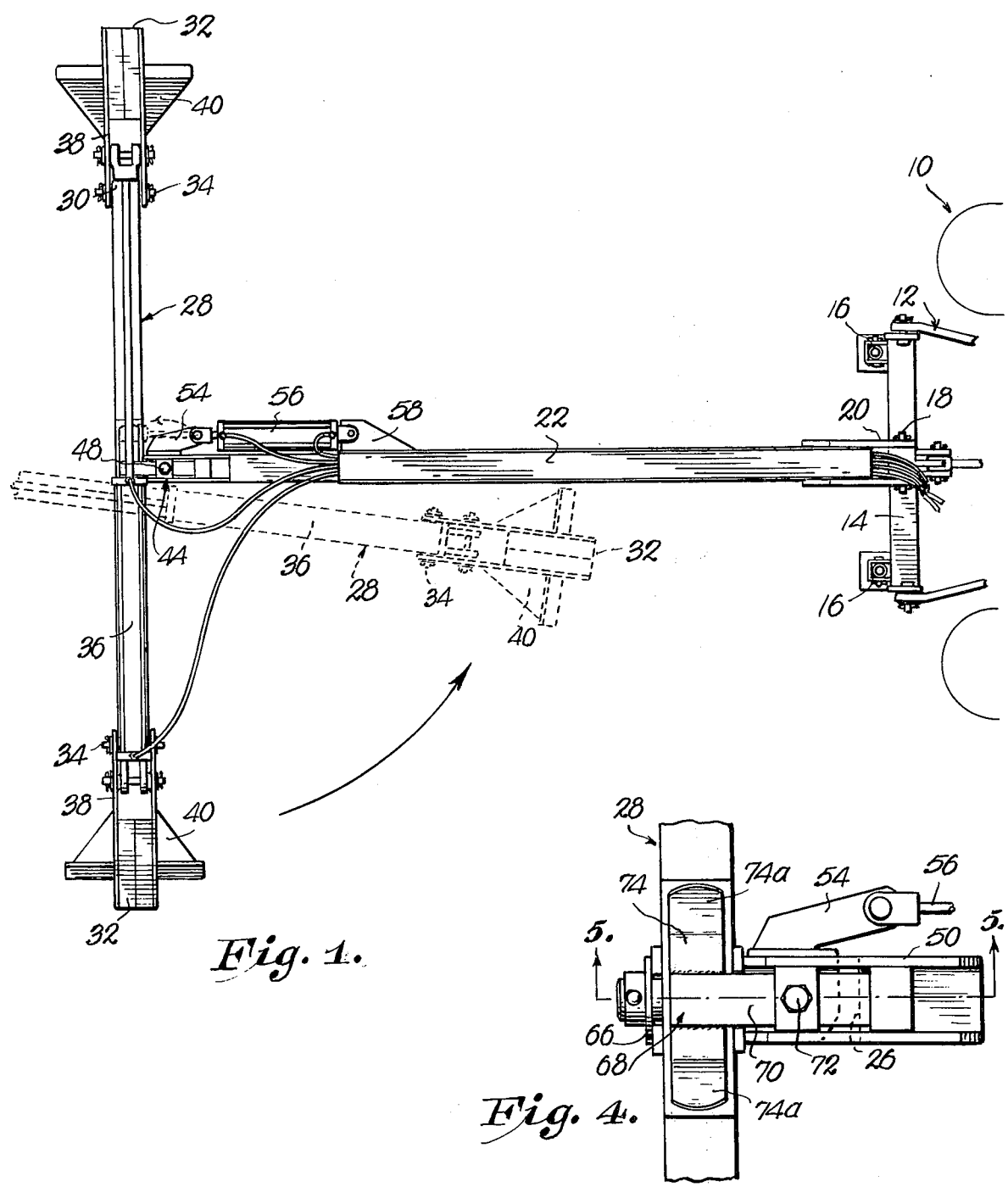

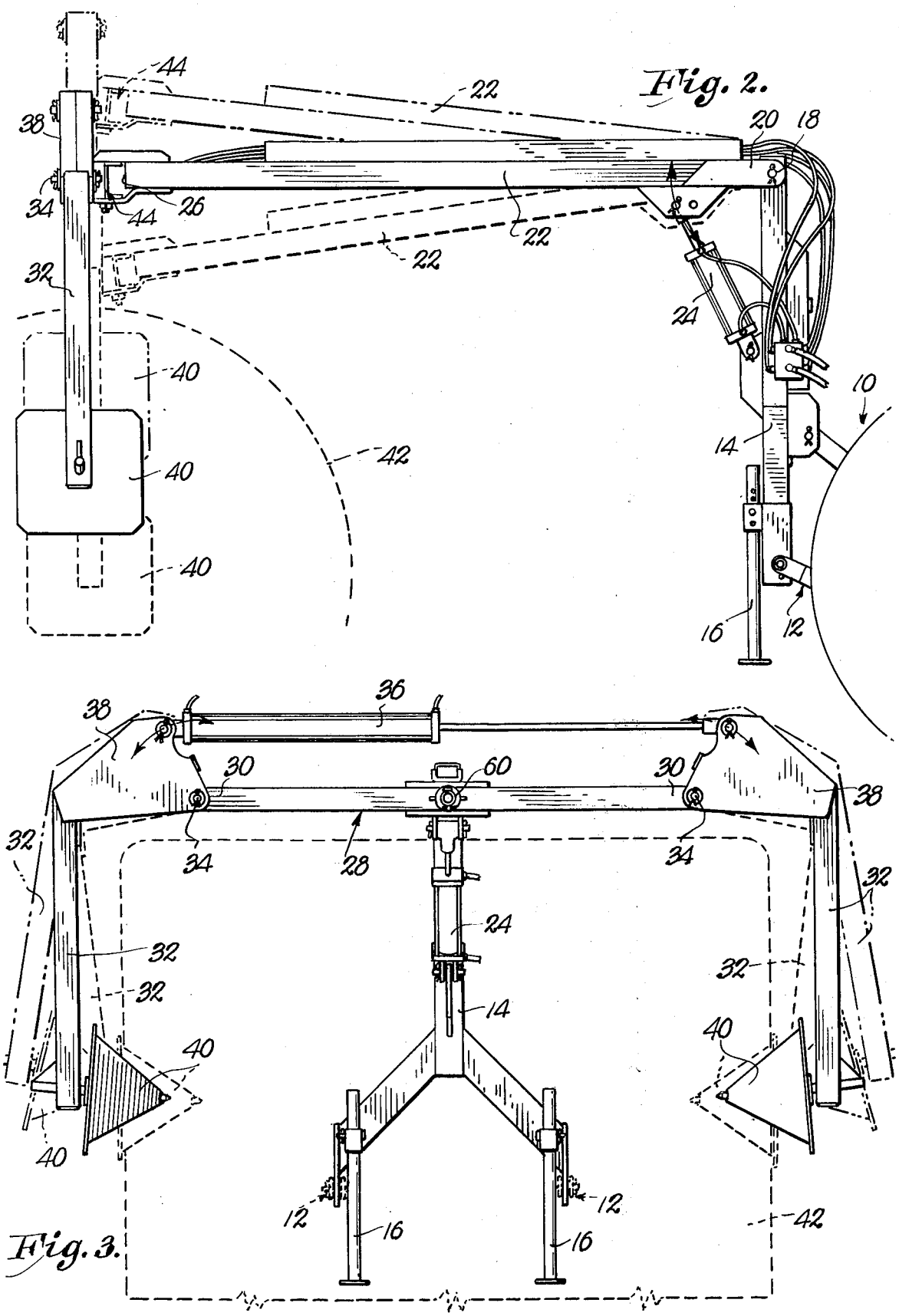

ROUND BALE HAULER AND UNROLLER

This invention relates to apparatus which is especially well suited for the handling and feeding of large, cylindrical bales of hay and other animal foodstuffs having circular cross sections, such bales commonly being referred to as "round bales."

Large round bales have become increasingly popular in recent years because of the numerous advantages they afford in terms of time and labor savings as well as excellent watershedding characteristics. With the growth of this popularity, however, has come the need for ways in which to handle and feed the bulky bales to livestock, it not being unusual for such bales to weigh in excess of 1200 pounds. Since the bales are formed by coiling up a continuous ribbon or layer of material, it has heretofore been proposed to present the material to livestock by simply unrolling a bale along the ground in the reverse direction to which it was formed, thereby laying down a relatively even layer of material upon which the livestock can feed. One example of mechanism for accomplishing this style of feeding is illustrated in U.S. Pat. No. 3,880,305 to Van Polen.

While the arrangement disclosed in that patent is adequate in many respects, it does not provide the degree of maneuverability and handling ease which is so often needed by the operator in his day-to-day handling and feeding procedures. For example, the operator is oftentimes confronted with relatively tight confines within which he must maneuver the tractor and bale handling apparatus, and it is not at all unusual for the bale to be disposed at an odd angle relative to the tractor prior to pickup, rather than being positioned with its longitudinal axis perfectly perpendicular to the path of travel of the tractor.

Hence, there is a substantial need in this art for handling and feeding apparatus that will provide a high degree of maneuverability, substantial ease of operation, and exceptional capability of unrolling the bale while traveling in either forward or reverse directions. While a number of booms, couplings, pivots, clamps and the like can be found scattered throughout the art, such as for example, in U.S. Pat. Nos. 3,325,029 to Rigsby; 2,725,996 to Britton; 2,788,143 to Tendresse; 2,870,926 to Shook; 3,319,813 to Beyea; and 3,330,056 to Woodside et al, no apparatus has previously been available for handling and feeding round bales with the high degree of proficiency required to meet the exceptional needs of the livestock feeder.

Accordingly, it is one important object of the present invention to fill this existing need by providing round bale handling and feeding apparatus that is so highly maneuverable as to enable the bale to be approached and handled in a number of angular positions relative to the tractor in order to enable the operator to overcome obstacles of tight confines, physical obstructions, and bale disorientation.

Another important object of this invention is to facilitate unrolling of a bale with the tractor moving either in forward or reverse, such being accomplished by allowing the bale to be freely trailed outwardly beyond the rear end of the boom when the tractor is moving forwardly and freely swung forwardly to a position tucked under the end of the boom when the tractor is moving rearwardly.

An additional important object of this invention is to provide a degree of radial flotation of the crosshead which carries the bale at the outer end of the boom in order to compensate for and fully accommodate any uneven loading which might be applied to opposite ends of the crosshead as the bale is carried by the latter or unrolled along the ground.

In the drawings:

FIG. 1 is a top plane view of a bale handling and feeding apparatus constructed in accordance with the principles of our present invention, the broken lines indicating an alternative position for the crosshead of the apparatus located alongside the main lifting boom thereof;

FIG. 2 is a side elevational view of the apparatus illustrating in broken lines the manner in which the lifting boom can be raised and lowered during operation;

FIG. 3 is a rear end elevational view of the apparatus with broken lines again used to indicate alternative positions for the clamping arms;

FIG. 4 is an enlarged, fragmentary top plan view of the coupling between the rear end of the boom and the crosshead;

FIG. 5 is an enlarged, fragmentary cross-sectional view of the coupling taken along line 5—5 of FIG. 4; and FIG. 6 is an enlarged, fragmentary cross-sectional view of the coupling taken substantially along line 6—6 of FIG. 5.

A tractor 10 has a three-point hitch 12 that carries a generally upright pedestal 14 for vertical swinging movement as hitch 12 is raised and lowered. Pedestal 14 has a pair of vertically adjustable, ground-engaging stabilizers 16 which may be employed under certain circumstances, such as when the bale is to be lifted and swung to a new location without advancing the tractor 10.

The upper end of pedestal 14 has a pivotal connection 18 with the inner end 20 of a generally fore-and-aft extending, elongated boom 22 that is adapted for vertical swinging movement about connection 18 by means of a double-acting, fluid pressure piston and cylinder unit 24 which extends between pedestal 14 and boom 22. The outer end 26 of boom 22 carries a crosshead 28 coupled with boom 22 intermediate the opposite ends 30 of crosshead 28. A pair of clamping arms 32 depend from opposite ends 30 for swinging movement toward and away from one another about pivots 34, and a double-acting fluid pressure piston and cylinder unit 36 connected between bifurcated gussets 38 on arms 32 provides the power necessary to accomplish such swinging. A conical pintle 40 projects inwardly from the lower extremity of each arm 32 respectively, and pintles 40 are preferably mounted on arms 32 in such a manner as to be selectively freely rotatable relative to arms 32 about aligned transverse axes which extend generally parallel to crosshead 28 when unit 36 is fully extended as illustrated in FIG. 3. Arms 32 are long enough to accommodate a bale 42 shown in broken lines in FIGS. 2 and 3 with the pintles 40 engaged concentrically within the opposite ends of bale 42.

Crosshead 28 is connected to boom 22 through a special coupling 44 that provides a great degree of maneuverability of crosshead 28 relative to the boom 22. In this regard, coupling 44 includes a hollow, box-like component 46 retained by a normally upright pivot shaft 48 between a pair of upper and lower plates 50 and 52 respectively that extend outwardy beyond end 26 of boom 22. A crank 54 projecting outwardly from one side of component 46 is pivotally connected to a double-acting, fluid pressure piston and cylinder unit 56 that is connected at its opposite end to an ear 58 on boom 22 in order to provide powered rotation of component 46 about pivot shaft 48. Coupling 44 further includes a stub shaft 60 rigidly affixed to component 46 and projecting outwardly from the latter substantially beyond end 26 of boom 22 in axial alignment with the latter when crosshead 28 is disposed in its transverse position as illustrated in FIG. 1. Stub shaft 60 in turn extends through and rotatably supports a tubular bearing member 62 that is rotatably housed within the crosshead 28, the latter being hollow and of generally rectangular configuration as illustrated best in FIG. 5.

Bearing member 62 is substantially coextensive in length with crosshead 28, and by virtue of its confinement within crosshead 28, the latter is adapted for swinging about pivot shaft 48 between the alternative positions illustrated in FIG. 1 upon actuation of power unit 56. The rotatable fit between member 62 and stub shaft 60 provides for swiveling of crosshead 28 about the axis of shaft 60, and openings 64 in opposite front and rear sides of crosshead 28 clear shaft 60 and are elongated in a normally vertical direction so as to permit crosshead 28 to rock about bearing member 62 in opposite directions within the limits provided by openings 64. A keeper assembly 66 on the outermost end of stub shaft 60 retains the crosshead 28 and bearing members 62 on the stub shaft 60. Openings 64 are preferably so sized as to limit rocking of crosshead 28 to 15° in either direction from the normal intermediate position illustrated in FIG. 5.

Swiveling of crosshead 28 and bearing member 62 about stub shaft 60 is yieldably resisted by a leaf spring 68 which overlies and engages the top of crosshead 28. Spring 68 is generally T-shaped, having a main leg 70 which overlies and extends outwardly beyond the end 26 of boom 22 (leg 70 being attached to boom 22 by the head 72 of pivot shaft 48) and a transverse leg 74 that extends in opposite lateral directions from leg 60. The opposite terminal ends of leg 74 have upward curls 74a that make the primary engagement with the top of crosshead 28. The resiliency of spring 68 is such as to permit swiveling of crosshead 28 to the extent of approximately 15° in either direction from its normal position illustrated in FIG. 6 in which the crosshead 28 is substantially level with respect to boom 22.

In operation, the tractor 10 may be backed to a bale 42 and power unit 24 operated to swing boom 22 to the proper height depending upon the position of bale 42. Substantially simultaneously, the power unit 36 may be actuated to swing arms 32 outwardly away from one another so that upon lowering boom 22, arms 32 embrace bale 42 with pintles 40 substantially concentrically disposed at the opposite ends of bale 42. Extension of power unit 36 then causes arms 32 to swing toward one another, impaling pintles 40 within the bale 42. If pintles 40 are then made freely rotatable relative to their arms 32 and bale 42 is left in engagement with the ground, advancing or backing up tractor 10 causes the bale 42 to progressively uncoil, laying down an even ribbon of material upon which livestock may feed.

On the other hand, if it is only desired to move the bale 42 rather than to feed the same, power unit 24 may be extended to elevate boom 22 and thus raise bale 42 above the ground for transport. Pintles 40 may be locked against rotation during this time if desired.

In uncoiling bale 42 it is desirable to have the arms 32 angled back away from the direction of movement of tractor 10 so that bale 42 can be rolled along the ground with the least resistance to rolling action. This is desirable whether tractor 10 is driven forwardly or in reverse.

By virtue, then, of the limited rocking action which crosshead 28 may make about bearing member 62 when bale 42 is engaged with the ground and tractor 10 is moved forwardly, arms 32 swing rearwardly to become slightly rearwardly inclined with respect to boom 22. On the other hand, if the bale 42 is engaged with the ground and tractor 10 is backed up, the arms 32 rock crosshead 28 in the opposite direction limited by openings 64 until arms 32 assume a slightly forwardly inclined orientation with bale 42 tucked under boom 22. Thus in either condition, bale 42 is effectively pulled along the ground by arms 32 rather than attempted to be pushed thereby.

Note further that this action is self-generated; that is, it requires no extra effort on the part of the operator to assure that the bale 42 is properly disposed in the best position for rolling in accordance with the direction of travel of tractor 10. The free rotation of crosshead 28 about bearing member 62 assures that the arms 32 will automatically assume their properly inclined positions for unrolling of bale 42 immediately following initial movement of tractor 10.

Tucking bale 42 in under boom 22 when tractor 10 is backed up for unrolling bale 42 is well accommodated by virtue of the fact that the bale engaging pintles 40 are located a substantial distance rearwardly from pedestal 14. Thus, there is more than ample clearance for the bale 42 to be disposed beneath boom 22 and behind pedestal 14 during unrolling as the tractor 10 is backed up.

This remote disposition of pintles 40 relative to the pedestal 14 is also important because it provides for maneuvering crosshead 28 between its transverse and longitudinal positions illustrated in FIG. 1. In many instances the bale to be handled may be disposed with its longitudinal axis perfectly perpendicular to the path of advancement of tractor 10, which need be of no concern to the operator utilizing the present invention because it is but necessary for him to actuate power unit 56 to the extent necessary to rotate crosshead 28 about pivot shaft 48 to the proper angled position relative to boom 22. The bale may even be disposed with its axis substantially parallel to boom 22, in which event crosshead 28 is simply rotated to the dotted line position illustrated in FIG. 1 where it is disposed alongside of boom 22. Arms 32 are then actuated in the manner above described to engage pintles 40 within the bale, whereupon the crosshead 28 may then be reestablished in its transverse position for unrolling of the bale if such is desired.

This feature of the apparatus is highly desirable because it is not unusual for the bales to be stacked one on top of the other in the corner of a field confined by intersecting fences. It often becomes necessary, then, to approach the bales from their ends and to work within relatively tight confines. The degree of maneuverability provided by this arrangement permits the operator to pick up, move and subsequently feed the bales with ease even under relatively difficult circumstances.

Swiveling of the crosshead 28 about stub shaft 60 provides a degree of radial flotation for crosshead 28 which may be desirable under a number of conditions. For example, the load presented by the bale which is picked up may be somewhat off-center relative to shaft 60, in which event crosshead 29 can swivel slightly in the direction of the extra load, resisted only by the leaf spring 68. This, of course, reduces the strain placed upon the connection between crosshead 28 and boom 22 as the increased load is transmitted to and absorbed by the spring 68. Moreover, as the bale is unrolled, it may encounter uneven terrain between its opposite ends which tends to raise or lower one end of the bale relative to the other. Again, the free swiveling of crosshead 28 about stub shaft 60, resisted yieldably by spring 68, fully accommodates for the uneven forces which are transmitted to the boom 22.

It should therefore be apparent that we have provided a handling apparatus which is ideally suited for large round bales and which affords a degree of maneuverability and proficiency in operation not heretofore available in previous bale handling mechanism. The livestock feeder is provided with an apparatus that enables him to manipulate the bales with ease and under many adverse conditions such as tight confines, physical obstructions, uneven terrain and bale disorientation.

Having thus described the invention, what is claimed as new and desired to be secured by Letters Patent is:

1. Round bale handling apparatus for use with a mobile prime mover, said apparatus comprising:
    an elongated, normally fore-and-aft extending boom;
    means at one end of said boom for mounting the latter on said prime mover for up-and-down swinging movement relative to the prime mover;
    first power means operably coupled with said boom for accomplishing said swinging movement thereof;
    an elongated crosshead at the opposite end of said boom having a pair of opposite ends remote from the boom;
    a pair of arms swingably depending from said opposite ends of the crosshead;
    second means operably coupled with said arms for swinging the latter toward and away from one another below said crosshead;
    a pintle projecting inwardly from each of said arms respectively for engaging and rotatably supporting a round bale concentrically by its ends when said second power means is actuated,
    said boom having a pivotal coupling with said crosshead between said opposite ends of the latter; and
    third power means operably coupled with said crosshead for selectively swinging the latter in opposite directions about said coupling between alternative extreme positions extending transversely to and alongside of the boom, whereby to permit pickup of a bale lengthwise of the boom and unrolling of the bale crosswise of the boom as the prime mover is advanced.

2. Round bale handling apparatus as claimed in claim 1, wherein said coupling between the boom and the crosshead includes means permitting limited rotation of the crosshead in opposite directions about its longitudinal axis.

3. Round bale handling apparatus as claimed in claim 2, wherein said means permitting said limited rotation of the crosshead includes an elongated bearing member fixed to the boom against rotation with the crosshead about is longitudinal axis, said member being substantially coextensive in length with the crosshead and rotatably housed within the latter.

4. Round bale handling apparatus as claimed in claim 3, wherein said means permitting said limited rotation of the crosshead further includes a stub projecting outwardly beyond said opposite end of the boom and supporting said member, said crosshead having an opening receiving said stub and enlarged with respect to the latter in the direction of rotation of the crosshead about the member.

5. Round bale handling apparatus as claimed in claim 4, wherein said member is mounted on said stub for rotation of the member and crosshead about the longitudinal axis of the stub.

6. Round bale handling apparatus as claimed in claim 5, wherein said boom is provided with means yieldably maintaining the crosshead level with respect to the longitudinal axis of the boom.

7. Round bale handling apparatus as claimed in claim 6, wherein said yieldable maintaining means includes a leaf spring mounted on and projecting outwardly beyond said opposite end of the boom, said spring extending in opposite transverse directions from its mounting on the boom along and in overlying relationship to said crosshead.

8. Round bale handling apparatus as claimed in claim 4, wherein said coupling further includes a component fixedly supporting said stub and rotatable on the boom with the stub about an axis perpendicular to the latter, said third power means being connected between said component and the boom.

9. Round bale handling apparatus as claimed in claim 1, wherein said means for mounting the boom on the prime mover includes a normally upright pedestal connected at its upper end with said one end of the boom, said connection between the pedestal and the boom being pivotal for swinging of the boom about a normally horizontal axis relative to the pedestal.

10. Round bale handling apparatus as claimed in claim 9, wherein said crosshead is coupled with the boom for limited free-swinging movement of the arms toward and away from said pedestal during raising and lowering of the boom.

* * * * *